United States Patent [19]

Kitaura et al.

[11] 4,300,825
[45] Nov. 17, 1981

[54] CONTROL OF SHUTTER CLOSING FOR EXCESSIVE OBJECT BRIGHTNESS

[75] Inventors: Mashio Kitaura, Tondabayashi; Nobuyuki Taniguchi, Sakai, both of Japan

[73] Assignee: Minolta Camera Kabushiki Kaisha, Japan

[21] Appl. No.: 115,351

[22] Filed: Jan. 25, 1980

[30] Foreign Application Priority Data

Jan. 30, 1979 [JP] Japan .................................. 54-9812

[51] Int. Cl.³ .............................................. G03B 7/083
[52] U.S. Cl. ........................................ 354/34; 354/38; 354/51; 354/137; 354/267
[58] Field of Search ....................... 354/34, 38, 50, 51, 354/60 R, 60 F, 129, 137, 267

[56] References Cited

U.S. PATENT DOCUMENTS 3,683,767  8/1972  Sahara .................................... 354/51

FOREIGN PATENT DOCUMENTS 52-85423  6/1977  Japan .
52-116223 9/1977  Japan .

Primary Examiner—L. T. Hix
Assistant Examiner—Stafford D. Schreyer
Attorney, Agent, or Firm—Watson, Cole, Grindle & Watson

[57] ABSTRACT

In a camera shutter control system, film exposure is ensured even when object brightness is so high as to require a shutter speed faster than the maximum shutter speed available and at which shutter operation might not cause film exposure without the present invention. A delay circuit provides a delay in addition to the time provided by the shutter control circuit as a function of object brightness, and a delay control circuit actuates the delay circuit only when the object brightness exceeds a given level. An optional flash control circuit interrupts flash firing in response to the shutter closing signal of the shutter control system. In that case, the delay control circuit is disabled in response to the high brightness of the object illuminated by the flash light, by means of a low pass filter which does not allow the rapidly changing signal produced by the flash to be transmitted to the delay control circuit.

17 Claims, 5 Drawing Figures

CONTROL OF SHUTTER CLOSING FOR EXCESSIVE OBJECT BRIGHTNESS

BACKGROUND OF THE INVENTION

1. Field of the Invention

The present invention relates to an exposure control system for use in a photographic camera, and more particularly to an automatic exposure time control system capable of film exposure even when object brightness, i.e., the brightness of an object or scene to be photographed, is so high as to require a shutter speed faster than the maximum shutter speed the shortest exposure time that the camera shutter mechanism can provide. Additionally, the camera exposure control system according to the present invention may be used for controlling the duration of electronic flash firing.

It should be noted that the shutter speed is not determined only in accordance with the object brightness, but other exposure factors such as set diaphragm aperture and film sensitivity values contribute to the shutter speed determination. Thus, the shutter speed can be lowered by changing the diaphragm aperture or the film used. However, there are limits to the changes of such exposure factors. Film sensitivity is usually fixed. The maximum diaphragm aperture value is designed for each objective lens. Therefore, the following description of the out-of-range object brightness and excessive shutter speed is made with the assumption that other exposure factors such as diaphragm aperture and film sensitivity values are fixed.

2. Description of the Prior Art

In the case of a high object brightness that requires an out-of-range shutter speed, it often occurs that the shutter operates without exposing the film to scene light, due to shutter closure before the exposure opening or slit is formed. Even in such a case, when the shutter is cocked for another photograph, the unexposed film is advanced or wound-up for a length of one frame, being regarded as used, thus resulting in a waste of film. In such circumstances, it is desirable for the film to be exposed even with slight overexposure rather than not to be exposed at all.

Japanese Published patent application No. 52-41659 discloses an exposure control device which, for that purpose, enables film exposure even when the object brightness is so high as to require an out-of-range shutter speed. That exposure control device employs a circuit schematically shown in FIG. 1, wherein the output of light measuring circuit 1, including photodiode PD, is connected to the base of transistor Q1 with the collector thereof connected through resistor R1 to timer capacitor C1. Switching circuit 2 is designed to control electromagnet Mg for initiating the shutter closing operation after a time lapse that is a function of the voltage across serially connected capacitor C1 and resistor R1.

In ordinary exposure control circuitry, no resistor is provided in series with timer capacitor C1, and switches S1 and S2 are turned ON and OFF, respectively, upon opening of the shutter, thereby causing the collector current of transistor Q1, which is commensurate with the output of light measuring circuit 1, to start the charging of the timer capacitor. When the charged voltage of the capacitor reaches a predetermined level, the switching circuit is inverted to actuate electromagnet Mg, thereby initiating shutter closing operation.

In contrast thereto, the exposure control device described in the aforementioned Japanese Published application includes resistor R1 interposed between capacitor C1 and transistor Q1, and switches S1 and S2 thereof are operated with a slight delay from the shutter opening by means of a delay or retard mechanism (not shown). Because of the existence of resistor R1, the input voltage of switching circuit 2 is lower by the voltage drop caused by the current flowing through resistor R1 for charging capacitor C1, than the input voltage without resistor R1. Thus, the inversion of switching circuit 2 occurs earlier than when resistor R1 is not provided, thereby compensating for the delay in the operation of switches S1 and S2. If the object brightness is extremely high, the charging current for capacitor C1 and the voltage drop across resistor R1 are so high that switching circuit 2 is inverted substantially simultaneously with the operation of switches S1 and S2. However, as switches S1 and S2 are mechanically constructed to operate with a given delay time from the shutter opening, exposure for a time corresponding to that delay is at least assured. Thus, the proposed prior art device ensures exposure at excessive object brightness without causing substantial photographic error under normal conditions.

If the prior art proposed exposure control circuit shown in FIG. 1 is also used for an automatically light controlled electronic flash, the amount of flash light controlled thereby tends to be smaller than a suitable value for the following reason. When the flash firing duration is controlled by the circuitry shown in FIG. 1, flash firing occurs in synchronization with the full opening of the shutter, and the reflected object light is converted by light measuring circuit 1 and transistor Q1 into an electric signal in the form of current which is integrated by capacitor C1. When the amount of light received by photocell PD reaches a predetermined level with the charged capacitor 1 voltage reaching a given value, switching circuit 2 is inverted to interrupt flash firing. In that case, since the voltage drop across resistor R1 rises at extremely rapid rate upon flash firing due to the current increase caused by the high intensity flash light reflected from an object, the input voltage of switching circuit 2 as a sum of the voltage drop and the terminal voltage of capacitor C1 reaches the predetermined level to stop the flash firing immediately after the commencement of the flash firing, resulting in the lack of the illumination of the object.

SUMMARY OF THE INVENTION

The general object of the present invention is to provide an automatic camera exposure control system which provides film exposure even when object brightness is so high as to require an out-of-range shutter speed.

Another object of the present invention is to provide an automatic exposure time control system which provides an exposure time commensurate with object brightness for normal photography, and additional exposure time for a higher out-of-range object brightness.

A further object of the present invention is to provide an automatic exposure control system which is capable of controlling film exposure and duration of electronic flash firing based on the light measurement, and which also provides additional exposure time for daylight or natural light photography at higher out-of-range object brightness, but provides normal operation for flash photography.

Yet another object of the present invention is to provide an automatic camera exposure control system which obviates the disadvantages of the above-mentioned conventional devices and guarantees exposure even when object brightness requires a shutter speed exceeding the highest value available in the camera.

The exposure control circuitry according to the present invention compares the output of a light measuring circuit with a signal corresponding to the maximum shutter speed, i.e. the shortest exposure time. When a shutter speed corresponding to the output of the light measuring circuit exceeds the maximum shutter speed, an exposure time adjusting or shifting circuit is brought into operation to lengthen the exposure time by a predetermined period so that the shutter may be controlled to provide a certain amount of film exposure.

In accordance with an embodiment of the present invention, an additional delay circuit is selectively actuated in accordance with a comparator output which compares a light measuring means output with a reference level, for additionally delaying the initiation of a timer circuit of an automatic exposure time control circuit subsequent to shutter opening; or delaying the energization of a shutter closing electromagnet subsequent to inversion of the output of a switching circuit for the automatic exposure time control circuitry.

According to an embodiment of the present invention, the output of the comparator may selectively actuate an indicating means.

The present invention is applicable to an exposure time control system for a single-lens reflex camera of the type that stores an electric signal commensurate with a light measurement for controlling exposure time as a function of the stored signal. In this case, actual exposure time may be lengthened by making the voltage to be applied to the timer circuit less than, or lower than, the output of the storage device, instead of providing the additional delay time as mentioned above.

Other and further objects, features and advantages of the present invention will be apparent from the following description taken in conjunction with the accompanying drawings.

DESCRIPTION OF THE PREFERRED EMBODIMENTS

Figure 1:
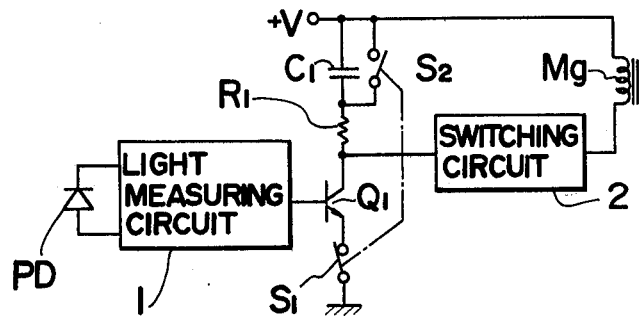
FIG. 1 is a schematic circuit diagram of a conventional exposure control device.
Figure 2:
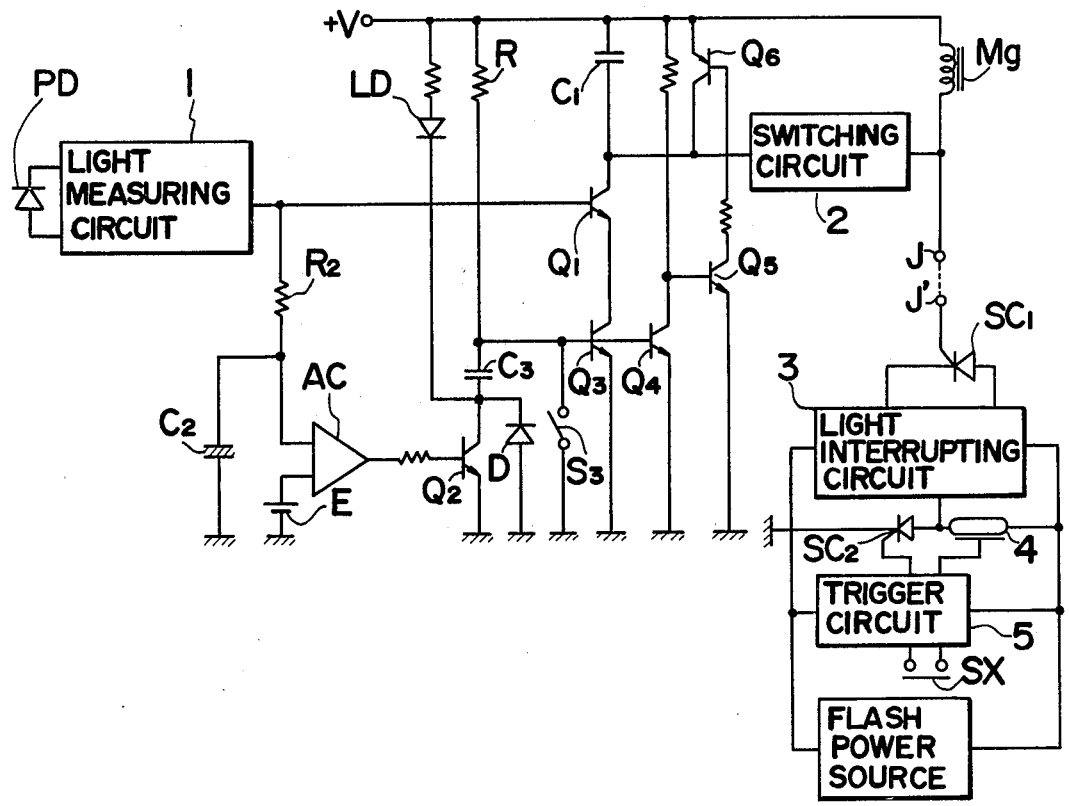
FIG. 2 is a circuit diagram of an embodiment of the present invention.

With reference to FIG. 2, which shows an embodiment of the present invention, the circuitry has substantially the same construction as that of the circuitry shown in FIG. 1 insofar as the shutter control section is concerned wherein timer capacitor C1 is charged with the collector current of transistor Q1 in accordance with the output of light measuring circuit 1 including photocell PD. When the charged voltage of capacitor C1 reaches a predetermined voltage level, switching circuit 2 is inverted to energize electromagnet Mg, which in turn initiates shutter closing operation. Transistors Q3 and Q6 respectively correspond to switches S1 and S2 in FIG. 1.

Analog comparator AC compares the output of light measuring circuit 1 with reference voltage E and generates a signal when the output of light measuring circuit 1 is higher than reference voltage E. Capacitor C2 and resistor R2 constitute a low-pass filter which prevents analog comparator AC from being responsive to the high frequency components in the output of light measuring circuit 1 caused by the flash light from an electronic flash as described, infra. Output terminal J of switching circuit 2 is adapted to be connected to gate electrode J' of thyristor SC1 in the electronic flash when the latter is coupled with the camera, such that in flash photography, the output of switching circuit 2 is used for interrupting flash firing simultaneously with initiation of a shutter closing operation.

Normal photographic operation, wherein normal exposure control is carried out in the circuitry of FIG. 2, is as follows. Reference voltage E is set to a level equal to the output voltage of light measuring circuit 1 when the latter measures the object brightness that requires the maximum or faster critical shutter speed e.g. 1/1000 second, so that the output of analog comparator AC has normally a low level to render transistor Q2 non-conductive. Switch S3 is opened upon initiation of a shutter opening operation. Since transition Q2 is non-conductive as mentioned above, with no charged current flowing through capacitor C3, the opening of switch S3 immediately simultaneously renders transistors Q3 and transistor Q4 conductive and transistor Q5 non-conductive to block transistors Q6. Thus, capacitor C1 commences time counting simultaneously with the shutter opening, and is charged through transistor Q1, which is controlled by the output of light measuring circut 1. When the charged voltage of capacitor C1 reaches a predetermined level, switching circuit 2 is inverted to actuate electromagnet Mg to initiate shutter closing operation.

The following is a description of the operation of the circuit of FIG. 2 when the object brightness is so high as to require a shutter speed faster than the fastest available shutter speed. In that case, the output of light measuring circuit 1 is higher than reference voltage E such that the output of analog comparator AC is high, causing transistor Q2 to be conductive, so that light emitting diode LD connected in series with transistor Q2 lights up to indicate that the object brightness is beyond automatic exposure control range. When switch S3 is opened with the opening of the shutter under such conditions, the charge of capacitor C3 is zero at this moment causing transistor Q3 to remain non-conductive with transistor Q4 non-conductive and transistors Q5 and Q6 conductive to short-circuit capacitor C1. Then capacitor C3 is charged through resistor R to reach a specified voltage level in a short time to render transistor Q3 conductive so that transistor Q1 becomes conductive after a slight delay from the shutter opening. At the same time, charged capacitor C3 renders transistor Q4 conductive to block transistors Q5 and Q6. Therefore, although the object brightness is high, film exposure for a time corresponding to the delay presented by the time constant of a resistor R and capacitor C3 is assured. Switch S3 is closed upon completion of a shutter closing operation, so that capacitor C3 is discharged through diode D and switch S3 whereby the circuitry returns to its original condition prior to exposure.

The following is a description in the case of flash photography. The object brightness is assumed to be low, causing the output of analog comparator AC to be at a low level and transistor Q2 non-conductive. Therefore, capacitor C1 starts to be charged simultaneously with the shutter opening. When the shutter is fully opened, synchronous electronic flash contact Sx, which is usually disposed within a camera, is closed to actuate trigger circuit 5, which in turn causes flash tube 4 to be fired. The flash light causes the object brightness to become suddenly high, but the output of analog comparator AC remains at a low level under the action of a low-pass filter comprising resistor R2 and capacitor C2. When capacitor C1 is charged to a predetermined level, switching circuit 2 is inverted to initiate shutter closing operation and simultaneously turn on thyristor SC1 to actuate light interrupting circuit 3, which in turn blocks thyristor SC1 and deenergizes flash tube 4. In the above described operation, the output of analog comparator AC remains at a low level, causing no delay due to capacitor C3. Thus the electronic flash is controlled in exactly the same manner as in the conventional automatic electronic shutter flash control with no delay means for the high excessive brightness.

Figure 3:
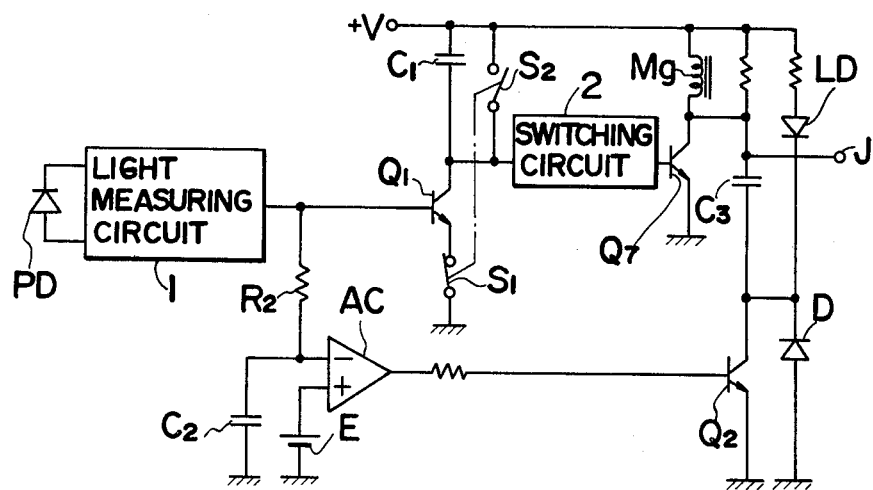
FIG. 3 is a circuit diagram of another embodiment of the present invention.

FIG. 3 shows another embodiment of the present invention, wherein the same reference numerals are used for the components corresponding to those of FIG. 2 and a further description thereof is omitted. The difference in this embodiment from that of FIG. 2 is that the delay circuit for ensuring exposure when the object brightness is too high, is provided at the output side of switching circuit 2. Switches S1 and S2, corresponding to transistors Q3 and Q6 of FIG. 2, are respectively closed and opened upon shutter opening to start the charging of capacitor C1. In the ordinary case, the output of analog comparator AC is low and transistor Q2 remains non-conductive. The output of switching circuit 2 is at a high level when photography is started, causing transistor Q7 to be conductive to energize electromagnet Mg. When capacitor C1 is charged to a predetermined voltage level, switching circuit 2 is inverted, causing the output of switching circuit 2 to become low to make transistor Q7 non-conductive. In this ordinary photography case, as transistor Q2 is non-conductive, charging current does not flow to capacitor C3, whereby when transistor Q7 is turned off, the current from electromagnet Mg is immediately blocked to thereby initiate a shutter closing operation.

In case of flash photography, with the inversion of switching circuit 2 the potential at output terminal J is high to thereby interrupt flash firing in the same manner as is done in the FIG. 2 embodiment. Since a low-pass filter comprising resistor R2 and capacitor C2 makes comparator AC non-responsive to a sudden rise of the output of light measuring circuit 1 due to flash light, no additional delay occurs for the flash control, as in the embodiment of FIG. 2.

When the object brightness is so high as to require out-of-range exposure time, the output of analog comparator AC is at a high level to render transistor Q2 conductive, causing light emitting diode LD to light up to indicate the high excessive object brightness. When the shutter is opened, switches S1 and S2 are immediately operated to start time counting by capacitor C1. In this case, however, switching circuit 2 is inverted in a period of time shorter than the available minimum exposure time, i.e., the fastest shutter speed. However, since transistor Q2 has been made conductive, with capacitor C3 being short-circuited by conductive transistor Q7, the voltage at terminal J is zero and current flows through electromagnet Mg to capacitor C3 even after transistor Q7 is turned off due to the inversion of switching circuit 2. The current to capacitor C3 decreases as it is charged, and the magnetic force of electromagnet Mg decreases to cause a shutter closing operation after a slight delay subsequent to the inversion of switching circuit 2. This delay ensures exposure for excessively high object brightness. When switches S1 and S2 are reset upon completion of exposure, switching circuit 2 is again inverted to return its output to a high level, which in turn makes transistor Q7 conductive, thereby causing capacitor C3 to be discharged through diode D and transistor Q7.

Figure 4:
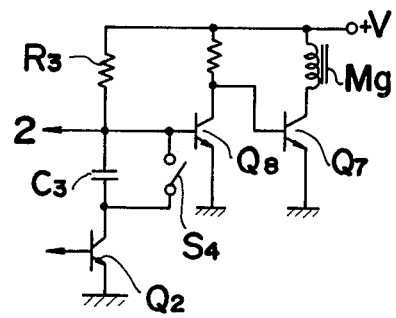
FIG. 4 is a circuit diagram partially illustrating a modification of FIG. 3.

Shown in FIG. 4 is a modification of the embodiment of FIG. 3, wherein the delay circuit of resistor R3 and capacitor C3 is interposed between switching circuit 2 and transistor Q7 with transistor Q8 connected between the delay circuit and transistor Q7. Transistor Q2 is maintained in an off condition while the object brightness is within the normal range. Switching circuit 2 is designed to generate a low level output signal during exposure and change its output signal to a high level in response to the main timer circuit. In normal brightness photography, since transistor Q2 is non-conductive, transistor Q8 is turned on and transistor Q7 off immediately when the output of switching circuit 2 is at a high level, whereby a shutter closing operation commences. When the object brightness is so high as to require a shutter speed beyond the fastest one, transistor Q2 is rendered conductive, and capacitor C3 which has been short-circuited by switch S4, starts to be charged when switching circuit 2 is inverted. At this moment, the mode between resistor R3 and capacitor C3 is low and transistor Q8 remains non-conductive and Q7 conductive. After a slight lapse of time, capacitor C3 is charged to a given level and transistor Q8 is turned on and transistor Q7 off, thereby deenergizing electromagnet Mg to start a shutter closing operation. Switch S4 is closed upon completion of a shutter closing operation to discharge capacitor C3.

Figure 5:
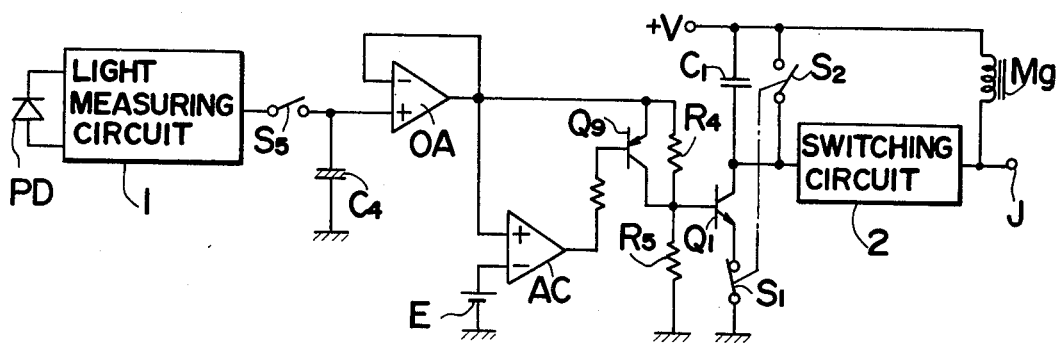
FIG. 5 is a circuit diagram of an embodiment of the present invention applied to a storage type exposure time control circuit for use in a single-lens reflex camera.

FIG. 5 shows still another embodiment according to the present invention which is applied for use in a single-lens reflex camera of the through-the-lens light measuring and light information storage type, wherein the same reference numerals are used for the components corresponding to the foregoing embodiments. A light information storage circuit including storage capacitor C4 and a level shift circuit therefor is connected between light measuring circuit 1 and transistor Q1. Storage switch S5 is opened immediately before the reflex mirror of the single lens reflex camera is actuated to move from its viewing to picture-taking position. Thus, the output of light measuring circuit 1 at this point of time is retained by capacitor Q4. Buffer amplifier OA is connected to storage capacitor C4. The base of transistor Q9 is connected to the output of comparator AC to be non-conductive when the object brightness has a higher out-of-range value. Resistors R4 and R5 are connected in series with each other to form a voltage divider.

The output of analog comparator AC is low for normal object brightness to make transistor Q9 conductive, thereby short-circuiting resistor R4, so that the voltage stored in capacitor C4 is directly applied to the base of transistor Q1. Thus, timer capacitor C1 is charged with a current directly commensurate with the object brightness to provide a correct exposure. When the object brightness is so high as to require a shutter speed faster than the maximum available one, the output of analog comparator AC is at a high level to render transistor Q9 non-conductive. Accordingly, the stored voltage of capacitor C4 is divided by resistors R4 and R5 and the voltage across resistor R5 is applied to the base of transistor Q1, whereby the exposure time is made longer than that commensurate with the object brightness to ensure film exposure. In other words, the voltage from storage capacitor C4 is shifted down by the voltage divider to lengthen the exposure time. It is to be noted that a subtraction circuit may be provided instead of the voltage divider circuit to lengthen the exposure time. The subtraction circuit may subtract an appropriate amount of voltage from the output of a light measuring circuit before it is applied to timer transistor Q1, when the exposure time is expected to exceed a normal range. It is also to be understood that the above embodiments are shown in the form of an analog circuit system, but the same function may be attained by digital circuit systems which can be constructed by those skilled in the art without any inventive effort from the above teachings. Thus, it should be understood that such digital systems fall within the scope of the present invention.

Having described our invention as related to the embodiments shown in the accompanying drawings, it is out intention that the invention not be limited by any of the details of the description, unless otherwise specified, but rather be construed broadly within its spirit and scope as set out in the accompanying claims.

What is claimed is:

1. A camera exposure control system comprising:
   a light measuring circuit for generating an output as a function of the brightness of an object to be photographed;
   a shutter control circuit for establishing an exposure time commensurate with said output to initiate shutter closure upon the expiration of said exposure time;
   a delay circuit for lengthening said exposure time, with respect to a given exposure time established by said shutter control circuit;
   an out-of-range detecting circuit for generating a signal when said output exceeds a predetermined level; and
   a delay control circuit for actuating said delay circuit in response to the signal from said detecting circuit.

2. The camera exposure control system as in claim 1 wherein said shutter control circuit includes a timer circuit actuated in response to shutter opening to generate a timing signal after a lapse of a time interval commensurate with said output, an electromagnetic actuatable for initiating shutter closure and a switching circuit for actuating said electromagnet in response to said timing signal.

3. The camera exposure time control system as in claim 1 wherein said detecting circuit includes means for generating said predetermined level, said predetermined level being substantially equal to said output that corresponds to the fastest shutter speed available in the camera, and a comparator for comparing said output with said predetermined level.

4. A camera exposure control system as claimed in claim 1, wherein said delay circuit lengthens said exposure time by adding a given amount of time to the exposure time established by said shutter control circuit.

5. A camera exposure control system comprising:
   light measuring means for generating an output as a function of the brightness of an object to be photographed;
   first delay means for providing a first delay time signal commensurate with said output;
   means for providing a reference voltage;
   comparator means for comparing said output with said reference voltage and generating a control signal with said output exceeding said reference voltage;
   first means for actuating said first delay means in response to shutter opening;
   electromagnetic means for initiating shutter closure;
   second means for actuating said electromagnetic means in response to said first delay time signal;
   second delay means for causing an additional delay between the shutter opening and the shutter closing; and
   delay control means for actuating said second delay means in response to said control signal.

6. The camera exposure control system as in claim 5 wherein said second delay means is interposed between said first delay means and said first means for actuating so that the actuation of said first delay means is delayed by said second delay means.

7. The camera exposure control system as in claim 5 wherein said second delay means is interposed between said second actuation means and said electromagnetic means for delaying the actuation of said electromagnetic means.

8. The camera exposure control system as in claim 5 wherein said second actuation means includes a switching circuit responsive to said first delay time signal for generating a shutter closing signal, and said system further comprising flash control means for interrupting the firing of an electronic flash in response to said shutter closing signal, and prevention means for preventing the generation of the control signal from said comparator means when said light measuring circuit measures the brightness of an object illuminated by electronic flash light.

9. The camera exposure control system as in claim 8 wherein said prevention means includes electric filter means for allowing passage of the output of said light measuring circuit to said comparator only when the output thereof changes slowly.

10. The camera exposure control system as in claim 5 further comprising storage means for storing said output, means for transmitting the stored output to said first delay means and means for diminishing said stored output during the transmission thereof.

11. The camera exposure control system as in claim 10 wherein said means for diminishing includes a voltage divider for dividing said stored output, the divided voltage being applied to said first delay means.

12. A camera exposure control system comprising:
   a light measuring circuit for generating an output as a function of the brightness of an object to be photographed;
   a shutter control circuit for controlling shutter speed in accordance with said output, said shutter control circuit includes storage means for storing said output, an integrating capacitor, semiconductor means for charging said integrating capacitor with a current commensurate with said stored output, an electromagnet for initiating shutter closure, and a switching circuit for actuating said electromagnet when said integrating capacitor is charged to a predetermined level;

a delay circuit for slowing the shutter speed controlled by said shutter control circuit;

an out-of-range detecting circuit for generating a signal when said output exceeds a predetermined level; and a delay control circuit for actuating said delay circuit in response to the signal from said detecting circuit.

13. The camera exposure control system as in claim 12 wherein said delay circuit includes means interposed between said storage means and said semiconductor means for decreasing the output transmitted from said storage means to said semiconductor means such that said semiconductor means receives the output that is lower than that stored in said storage means.

14. A camera exposure control system comprising:

a light measuring circuit for generating an output as a function of the brightness of an object to be photographed;

a shutter control circuit for controlling shutter speed in accordance with said output, said shutter control circuit includes a timer circuit actuated in response to shutter opening to generate a timing signal after a lapse of a time interval commensurate with said output, an electromagnet actuatable for initiating shutter closure and a switching circuit for actuating said electromagnet in response to said timing signal;

a delay circuit for slowing the shutter speed controlled by said shutter control circuit and interposed between said switching circuit and said electromagnet for delaying the actuation of said elctromagnet by said timing signal;

an out-of-range detecting circuit for generating a signal when said output exceeds a predetermined level; and a delay control circuit for actuating said delay circuit in response to the signal from said detecting circuit.

15. A camera exposure control system comprising:

a light measuring circuit for generating an output as a function of the brightness of an object to be photographed;

a shutter control circuit for controlling shutter speed in accordance with said output, said shutter control circuit includes a timer circuit actuated in response to shutter opening to generate a timing signal after a lapse of a time interval commensurate with said output, an electromagnet actuatable for initiating shutter closure and a switching circuit for actuating said electromagnet in response to said timing signal;

a delay circuit for slowing the shutter speed controlled by said shutter control circuit, said delay circuit is coupled with said electromagnet to delay the actuation of said electromagnet for a time, after the generation of said timing signal;

an out-of-range detecting circuit for generating a signal when said output exceeds a predetermined level; and a delay control circuit for actuating said delay circuit in response to the signal from said detecting circuit.

16. A camera exposure control system comprising:

a light measuring circuit for generating an output as a function of the brightness of an object to be photographed;

a shutter control circuit for controlling shutter speed in accordance with said output, said shutter control circuit includes a timer circuit actuated in response to shutter opening to generate a timing signal after a lapse of a time interval commensurate with said output, an electromagnet actuatable for initiating shutter closure and a switching circuit for actuating said electromagnet in response to said timing signal;

a delay circuit for slowing the shutter speed controlled by said shutter control circuit;

an out-of-range detecting circuit for generating a signal when said output exceeds a predetermined level;

a delay control circuit for actuating said delay circuit in response to the signal from said detecting circuit; and a flash control circuit for interrupting flash firing in response to said timing signal.

17. The camera exposure control system as in claim 16 further comprising an electric low pass filter for preventing transmission of said output to said delay control circuit when said output changes rapidly.

* * * * *